Dec. 18, 1962  M. PAPO  3,069,086
MATRIX SWITCHING AND COMPUTING SYSTEMS
Filed Nov. 5, 1959

INVENTOR
MAURICE PAPO
BY
ATTORNEY

Dec. 18, 1962  M. PAPO  3,069,086
MATRIX SWITCHING AND COMPUTING SYSTEMS
Filed Nov. 5, 1959  9 Sheets-Sheet 3

Dec. 18, 1962

M. PAPO 3,069,086

MATRIX SWITCHING AND COMPUTING SYSTEMS

Filed Nov. 5, 1959

Dec. 18, 1962  M. PAPO  3,069,086
MATRIX SWITCHING AND COMPUTING SYSTEMS
Filed Nov. 5, 1959

Dec. 18, 1962  M. PAPO  3,069,086
MATRIX SWITCHING AND COMPUTING SYSTEMS
Filed Nov. 5, 1959  9 Sheets-Sheet 8

| FIG. 10a | FIG. 10b |

3,069,086
MATRIX SWITCHING AND COMPUTING SYSTEMS
Maurice Papo, Paris, France, assignor to International Business Machines Corporation, New York, N.Y., a corporation of New York
Filed Nov. 5, 1959, Ser. No. 851,169
Claims priority, application France Nov. 6, 1958
18 Claims. (Cl. 235—176)

The present invention relates generally to data handling systems, and more particularly to data handling systems which employ bistable element matrices for switching or computing purposes.

Bistable element matrices are well known in the data handling arts. While several different bistable circuit elements, for example ferroelectric condensers, have been employed in such matrices, magnetic cores constructed of material exhibiting substantially rectangular hysteresis loop properties have enjoyed the widest usage. A conventional magnetic core matrix adapted for switching or computing purposes usually comprises a plurality of cores arranged in a coordinate network, for example, in rows and columns, in such a manner that any core in the network may be individually identified in terms of its particular coordinate position. Coordinate energizing means in the form of row and column conductors inductively coupled to the cores of the different rows and columns, are provided for activating or energizing the cores. An output winding is provided for each core in which a voltage is induced upon energization of the associated core. Depending upon the use to which the matrix is put, the output windings of the several cores may be connected in any of several different arrangements. In a system wherein the matrix is employed as a switching device to control a plurality of loads, the output windings are merely connected to the load circuits to be controlled. In a system wherein the matrix is employed for computing, a somewhat more complex arrangement is called for. A conventional computing matrix is arranged so that each of the coordinate energizing conductors represents an input term of a given computing operation. Each of the several cores is assigned a number which represents the result of the given operation upon the input terms represented by the particular combination of coordinate energizing conductors which designate that core. The output windings of all cores bearing identical result numbers are connected in common output circuits so that there exists a different output circuit for each possible result of the given computing operation upon the several input terms.

The operation of a matrix of the character described, whether it be employed for switching or for computing purposes, is essentially the same. Inputs in the form of current pulses, are applied simultaneously to a selected row conductor and a selected column conductor to energize all of the cores in the associated row and column. The input pulses are calibrated so that a single input is not sufficient to switch a core from one stable state to the other, but so that the additive effects of two input pulses coincidently applied are sufficient to do so. Thus only the core at the intersection of the energized row and column receives two inputs and is switched to a remanence state opposite to that of all other cores in the matrix. When this core is switched, or when it is subsequently reset to its initial remanence state, it generates an output signal in its associated sense winding. In a switching application, this output is employed to drive a desired load, while in a computing application, the output indicates the result of a computing operation involving the terms represented by the energized row and column conductors.

A matrix of the type described above is subject to several important limitations. To provide individual selection of any core in the matrix by coincident application of two drive currents, each of which is insufficient alone to switch a core, it is essential that the magnetic cores have a hysteresis cycle as rectangular as possible; that is to say, the ratio of coercive force, $H_c$, to the saturating field $H_s$, must approach 1. If this requirement is not met, the half currents will cause undesirable magnetic excursions of the non-selected cores in the matrix.

A matrix of the type described also requires pulse generators capable of applying well calibrated energizing currents. The coincidence of two half currents must create sufficient magnetizing force in a core to switch the core from one of its remanence states to the other, while one half current alone must develop a force less than that necessary to cause a substantial magnetic excursion of the core. The half currents, therefore, must have an optimum value between predetermined minimum and maximum values. The accurate adjustment of these half currents to that optimum value requires a calibrated device which must take into account not only the normal hysteresis characteristics of the core, but also the variation in hysteresis characteristics caused by temperature changes during operation of the matrix.

The present invention overcomes the limitations and disadvantages discussed above by making it unnecessary to calibrate the energizing current amplitude and by making it possible to employ magnetic cores having hysteresis loops which are not perfectly rectangular. These advantages are obtained by employing an improved system wherein the two energizing pulses which select one of the several cores in the matrix are applied one after the other rather than coincidently, the first pulse switching all of the cores of the selected row (or column) from an initial state to the opposite state, and the second pulse driving all of the cores of a column (or row) back to the initial state. With this arrangement, only the core at the intersection of the selected row and column is switched twice. The output signal developed during the second switching operation is employed as the useful output of the matrix. According to this improved system, each energizing pulse fully switches the selected core, and therefore no accurate calibration is needed. It is only necessary that the energizing pulse be superior to a minimum value so as to generate a magnetic field at least sufficient to switch a core from one remanence state to the other. There is, however, no maximum value. Also, since the cores are not required to discriminate between forces generated by a single half current and those generated by a coincidence of two half currents, the cores may be of lower quality, non-rectangular hysteresis loop material. The invention also makes it possible to employ other kinds of bistable elements not usable in coincident current matrices.

Accordingly, it is an object of this invention to provide a switching or computing matrix employing bistable circuit elements wherein the energizing pulses need not be calibrated and, therefore, wherein no calibrating device is required for the input pulse generators.

Another object of the invention is to provide a switching or computing matrix wherein high amplitude driving currents are employed to increase operating speed.

Still another object of the invention is to provide a switching or computing matrix employing bistable magnetic cores the hysteresis loops of which are not rectangular.

In magnetic core matrices which employ conventional coincident current selection, the useful output signal generated when a selected core is driven from one remanence state to the other is accompanied by spurious output signals generated by the other cores in the matrix which receive half current energization. These spurious signals reduce the signal-to-noise ratio of the system and require the use of detecting devices capable of discriminating between the desired output signals and the undesired noise signals. The improved system provided in accordance with the present invention offers the advantage that no spurious signals are generated during the time the useful output signal is developed and the signal-to-noise ratio is therefore very high.

Accordingly, it is an object of the present invention to provide a switching or computing matrix having a high signal-to-noise ratio.

In systems which employ conventional magnetic core matrices for computing purposes, both input terms of a computing operation must be simultaneously applied to the computing matrix to cause energization of the core in the matrix which corresponds to the result of the computing operation upon the input terms. In many systems, the two input terms do not occur or are not generated simultaneously. In systems of this type it is necessary to provide an intermediate memory or buffer wherein the first generated term is temporarily stored until occurrence of the second generated term. In a computing matrix provided in accordance with the present invention the need for this temporary storage is eliminated. According to the present invention, the two input pulses employed to select a bistable element in the matrix are applied successively and the matrix, itself, acts as a temporary storage of the first term pending application of the second term.

Accordingly, it is an object of this invention to provide a bistable element computing matrix capable of receiving the input terms of a computing operation in succession.

Another object of the invention is to provide a computing matrix capable of operating as a buffer storage unit for a first generated input term of a computing operation pending generation of the second input term.

More specifically, it is an object of the invention to provide a computing matrix arranged so that the first generated term of a computing operation to be performed is employed to condition the matrix to provide potential outputs corresponding to all of the results which may be obtained from that first term and wherein the second applied term of the computing operation is employed to select one of said potential results.

A further object of the present invention is to provide a single computing matrix arranged to perform any of several different computing operations, for example, additions, subtractions, multiplications, etc.

A still further object of the invention is to provide a single computing matrix arranged to provide the results of several different computing operations, for example, additions, subtractions, multiplications, etc. for a single pair of applied input terms.

Still another object of the invention is to provide a single computing matrix arranged to provide at a single group of output terminals, results of different computing operations, for example, addition, subtraction, multiplication, etc.

It is also an object of the invention to provide a switching or computing system empolying a bistable element matrix wherein the several input terms of a switching or computing operation are applied in sequence to a single group of input terminals.

Still another object of the present invention is to provide a bistable element matrix of the type wherein a combination of coordinate energizing means are activated to energize a selected bistable element and wherein a single group of control devices are employed to control the energizing means of each coordinate.

The foregoing and other objects, features, and advantages of the invention will be apparent from the following more particular description of preferred embodiments of the invention, as illustrated in the accompanying drawings.

Figure 4:
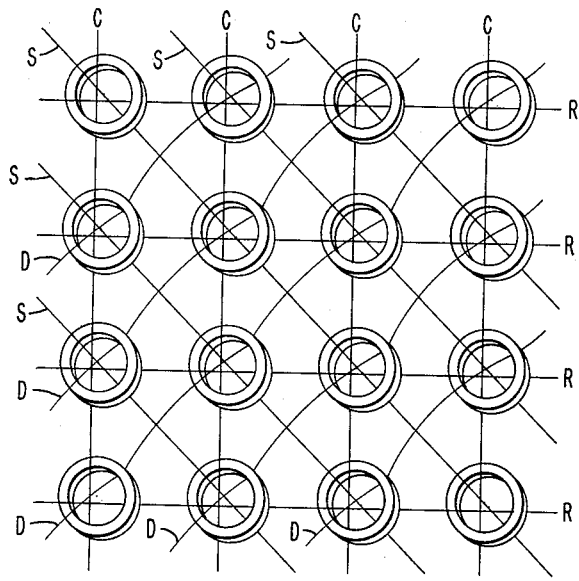
Figure 5:
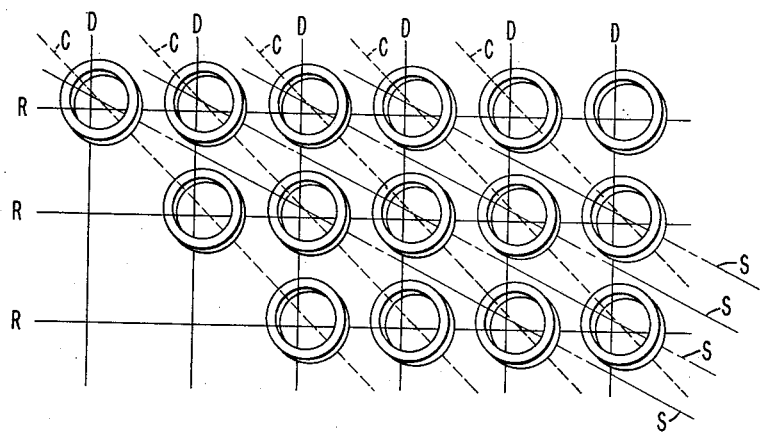
Figure 6:
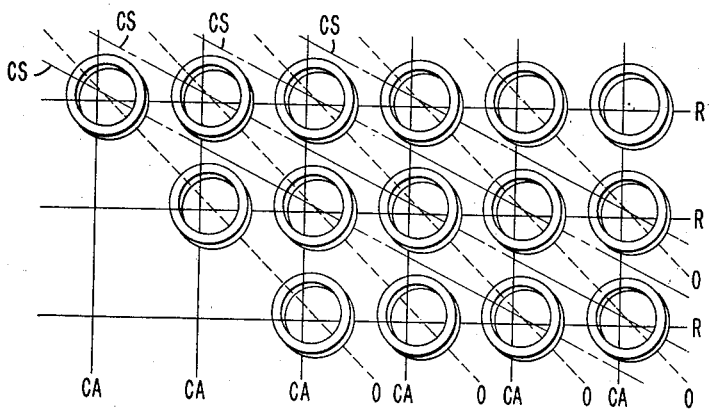
Figure 7:
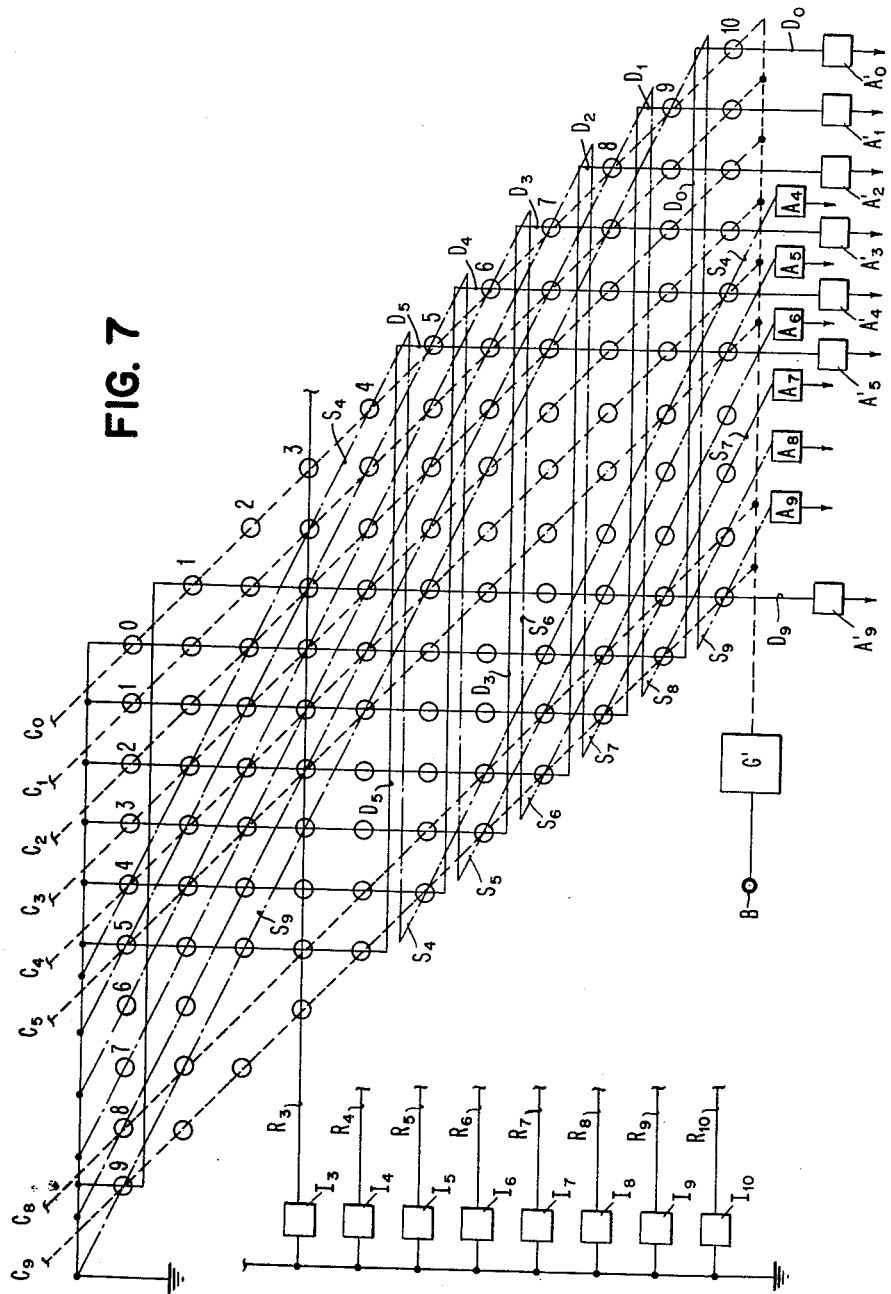
Figure 8:
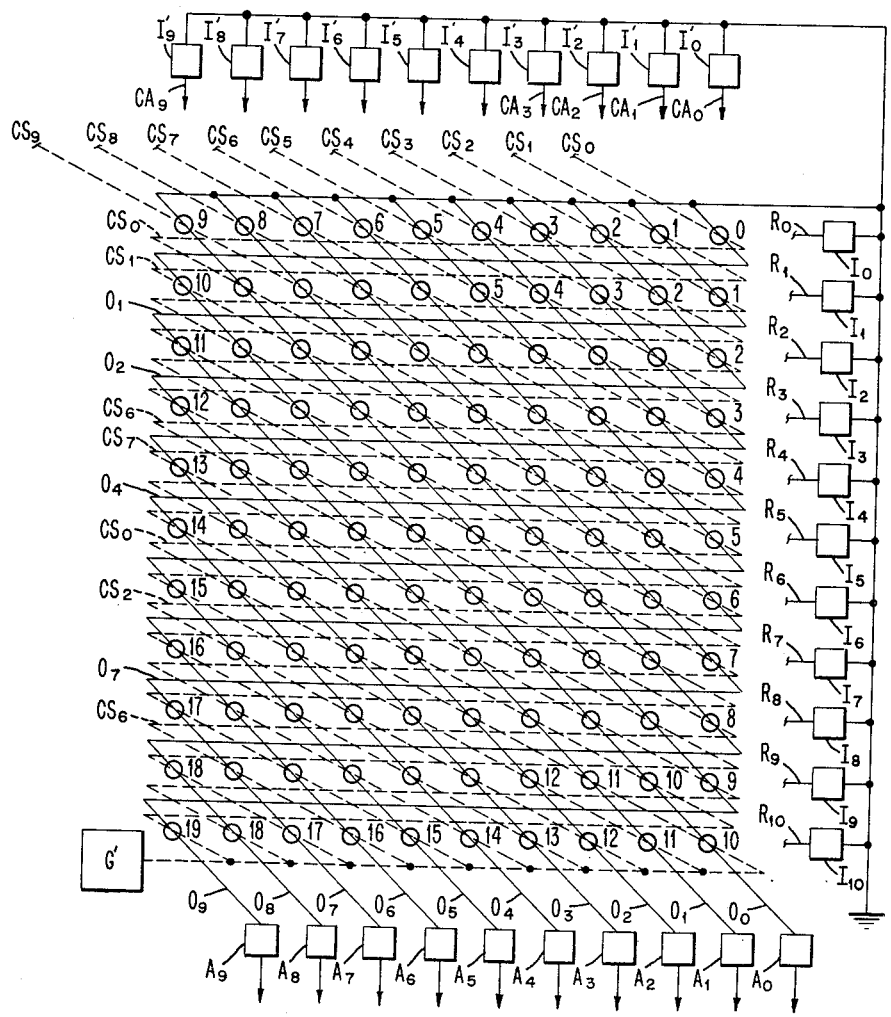
Figure 9:
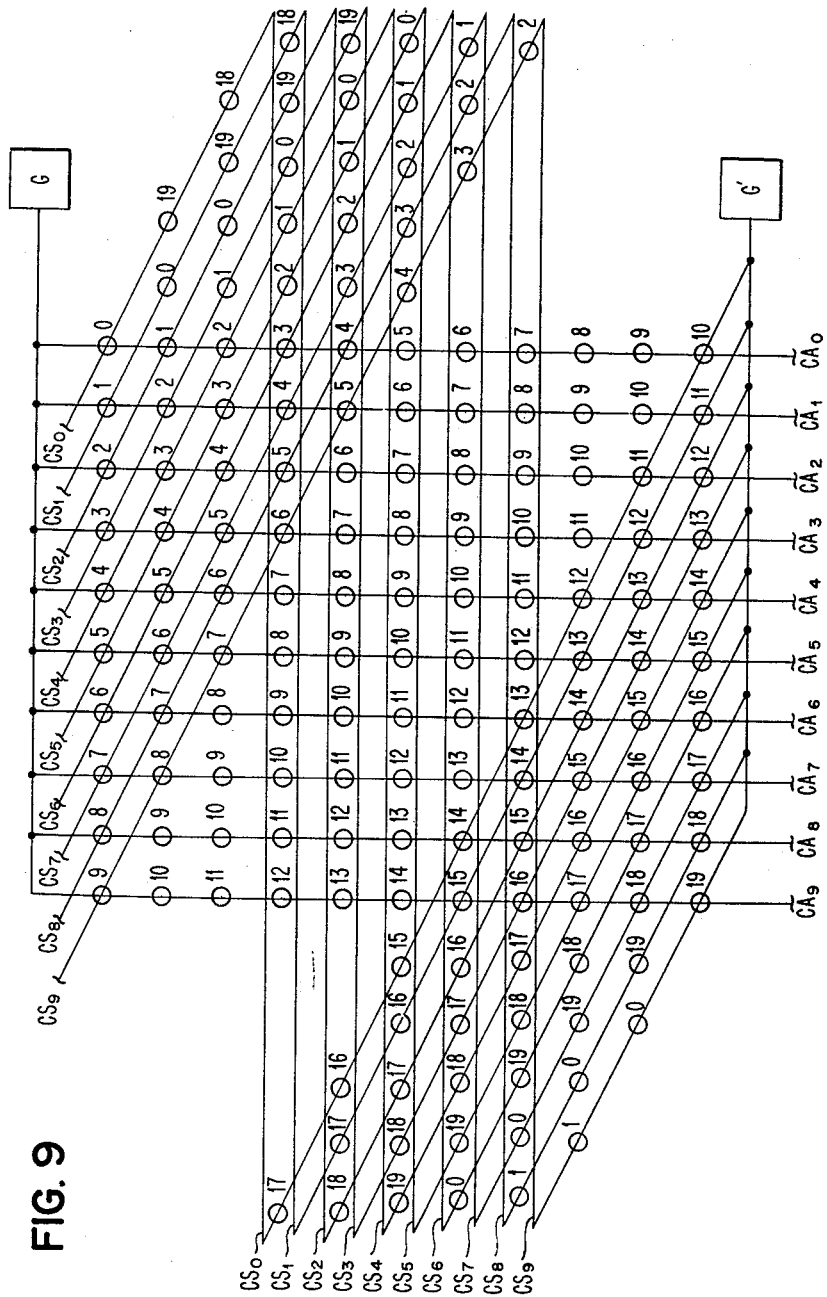
Figure 10A:
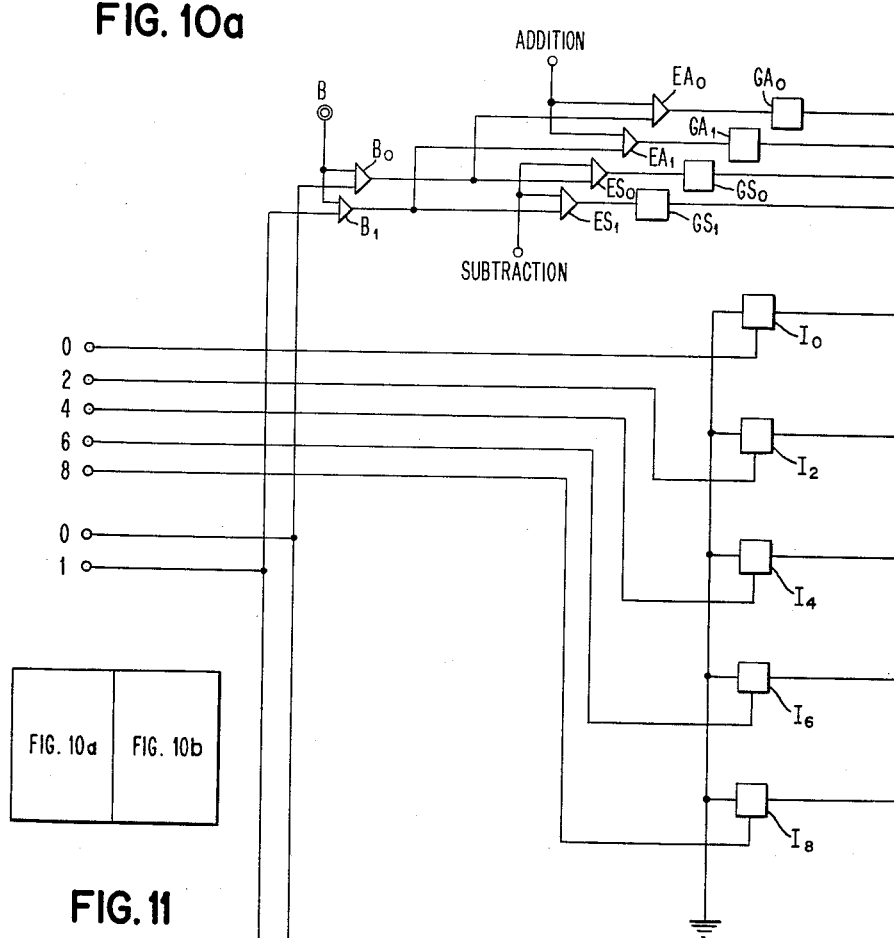
Figure 11:
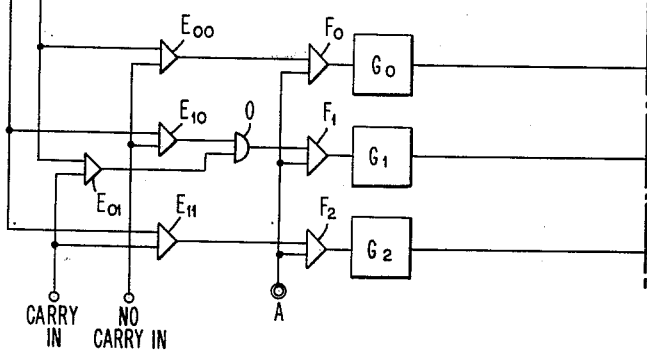

FIGURES 4, 5, and 6 illustrate different wiring modes for computing matrices which perform more than one computing operation;

FIGURE 7 represents a computing matrix capable of performing addition and subtraction wherein separate sets of output windings are provided for the different computing operations;

FIGURES 8 and 9 represent two other embodiments of computing matrices for performing both addition and subtraction wherein a single set of output windings is provided for each operation;

FIGURES 10$a$ and 10$b$ together represent a computing matrix system for performing additions and subtractions wherein a single set of input terminals are provided for receiving both terms of a computing operation; and FIGURE 11 illustrates the relationship of FIGURES 10$a$ and 10$b$ to each other.

The present invention relates to bistable element matrices such as are employed for switching or computing purposes. The several embodiments of the invention shown in the accompanying drawings and described hereinafter are arranged in the form of computing matrices for performing addition operations or subtraction operations, or both. It will be understood, however, that the invention may be applied to switching matrices as well, by providing output winding networks of the type suitable for such purposes.

The embodiments of the invention shown and described herein employ bistable magnetic cores as the bistable elements of the matrix. It will become apparent from the following description, however, that the invention is in no way limited to such devices, but is applicable to other bistable circuit elements as well. The magnetic cores are shown symbolically in the drawings as small circles which represent conventional torroids. Other shapes or configurations may, of course, be employed. The cores are of any suitable magnetic material having two opposite stable states of substantial magnetic remanence. These states may be arbitrarily designated as the 0 state and the 1 state in accordance with customary binary terminology. The state of a core may be altered as desired by application of a magnetic force or field to the core by means of a magnetizing winding coupled to the core. Application of a magnetic field $+H$ causes the core to be switched from the 0 state to the 1 state and the application of a magnetic field $-H$ switches it back to the 0 state and causes an output pulse to be generated. The 0 state is considered as the initial or home state, and all cores must be restored to the 0 state before an operation is started.

Figure 1:
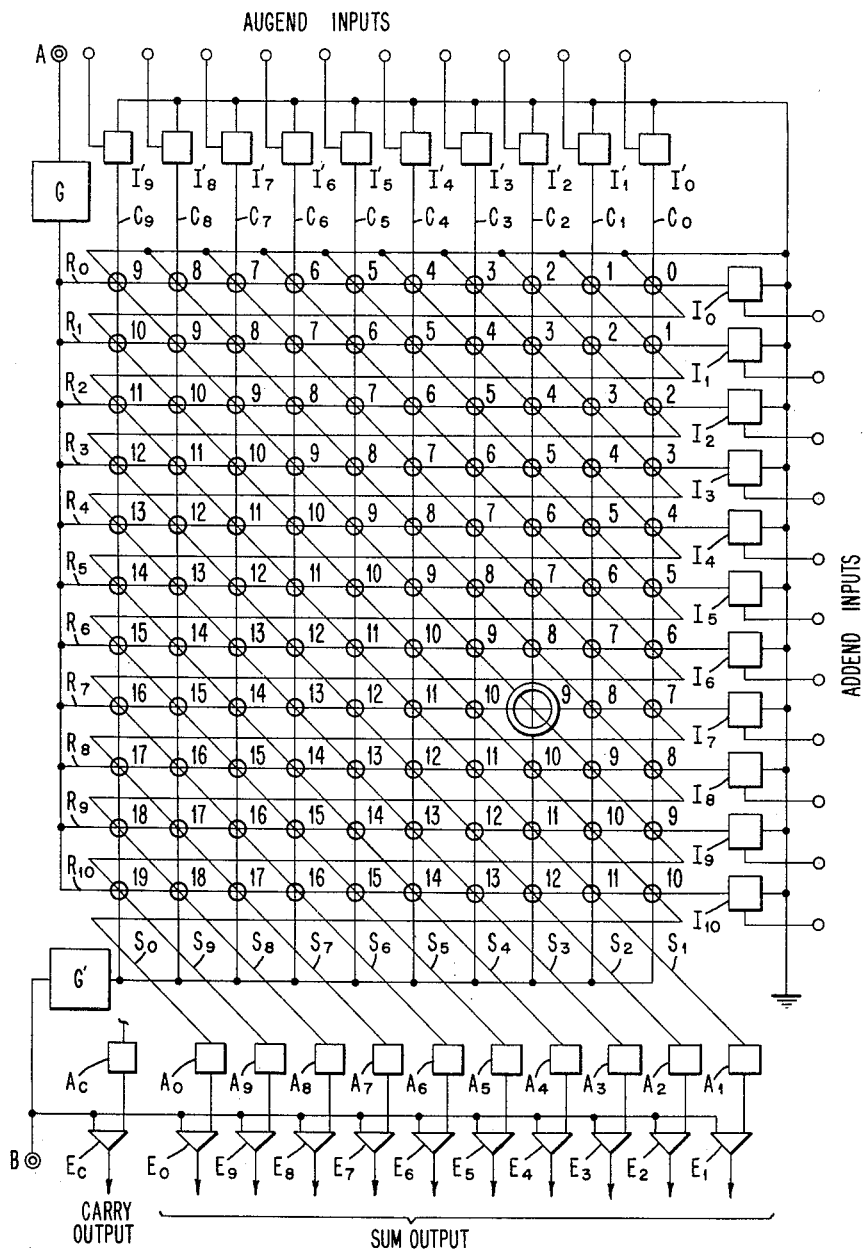
FIGURE 1 illustrates a computing matrix provided in accordance with the present invention for performing additions according to the decimal number system.

FIGURE 1 represents a computing matrix for performing additions of decimal numbers. It is composed of 110 magnetic cores arranged in a network comprising 11 rows and 10 columns. The rows are designated $R_0$, $R_1$, $R_2$, $R_3$, $R_4$, $R_5$, $R_6$, $R_7$, $R_8$, $R_9$, and $R_{10}$, and the columns are $C_0$, $C_1$, $C_2$, $C_3$, $C_4$, $C_5$, $C_6$, $C_7$, $C_8$, and $C_9$. These row and column reference characters also designate row and column conductors, described later herein. A magnetic core is positioned at the intersection of each row and each column. These 110 cores are designated by digits from 0 to 19, which digits correspond to the sum of the row and column subscripts. For example, at the intersection or row $R_6$ and column $C_8$, the core is designated by the number 14, which actually represents the sum of 8 and 6. As may be seen in the drawing representing the matrix, all cores providing the same results are placed along a diagonal line. For example there are 6 cores designated 14, which represent respectively the following sums: 10+4, 9+5, 8+6, 7+7, 6+8, and 5+9, which are located along the same diagonal.

The cores of the matrix are coupled by four or five windings of different types; two input windings, one sum output winding, one restoration winding, and possibly one carry output winding, the latter two not being represented in the figure. A winding may be composed of one turn or of any number of turns; to simplify the drawing, it is represented in the figure as comprising but one turn, that is to say, a single wire passing through the core.

The input windings of the cores of FIGURE 1 are connected serially to form the row conductors $R_0$–$R_{10}$ and the column conductors $C_0$–$C_9$. One input winding of each core is connected in series with the corresponding input windings of all other cores in the same row to form a row conductor and the other input winding on each core is connected with the corresponding input windings of all other cores in the same column to form a column conductor.

The row conductors $R_0$–$R_{10}$ are employed to record the first term of a computing operation in the matrix. Each of these conductors is connected at one end (the left end in FIGURE 1) to the output of a pulse generator G. The generator G is provided with an activating input terminal A to which an activating signal is applied from some suitable clock or timing source. The signal is applied, in a computing cycle, during a first time interval which may be termed "A time," and which corresponds to the interval during which the first input term is recorded. The opposite ends of the eleven row conductors are connected to ground or other suitable reference potential through row selecting switches $I_0$, $I_1$, $I_2$, $I_3$, $I_4$, $I_5$, $I_6$, $I_7$, $I_8$, $I_9$ and $I_{10}$. These switches may be of any suitable type, for example transistor switches. Each switch has its control element coupled to one of the addend input terminals to which the first term of a computing operation is applied. When the first term of an addition to be performed is applied, for example, 6, corresponding switch $I_6$ is energized by the corresponding input terminal, causing row $R_6$ to be short-circuited with ground. Generator G, during time A, supplies the 10 cores of row $R_6$ with current magnitude sufficient to fully switch all said cores from the 0 state to the 1 state. The first term of the addition, 6, is thus recorded in the memory. The ten cores designated 6 to 15 indicate all the results that may be obtained by the addition of the first term, 6. The information corresponding to that first term is stored in the matrix, until the application of the second term of the operation. At the end of the first portion of the computing cycle, the ten cores of row $R_6$ have been switched to the 1 state, all other cores being kept in the 0 state.

The column conductors $C_0$–$C_9$ are used to introduce the second term of the operation. During the time for entry of the second term, which will be more conveniently designated as "B time," pulse generator G' applies to a column a current pulse which generates a magnetic field —H which tends to switch all the cores of the energized column from the 1 state back to the 0 state, if they were previously in the 1 state, and keeps them in the 0 state if they were in that state before. Pulse generator G' is activated by a clock signal applied at its input terminal B during a second time interval, termed "B time." The output terminal of generator G' is connected with the column conductors corresponding to the 10 columns, and the circuits to ground through these conductors are controlled by the ten switches $I'_0$, $I'_1$, $I'_2$, $I'_3$, $I'_4$, $I'_5$, $I'_6$, $I'_7$, $I'_8$, $I'_9$, for selecting the columns. The control elements of these switch $I'_0$–$I'_9$ are connected to the augend input terminals to which the second term of a computing operation is applied. When the second term of the addition is applied for example, 8, the corresponding switch, $I'_8$, is energized by the corresponding input terminal, causing column conductor $C_8$ to be short-circuited with ground. Generator G' supplies a pulse, during "B time" to the eleven cores arranged on that column of a magnitude sufficient to switch all said cores to the 0 state. All the cores of that column were already in the 0 state except core 14 at the intersection of row $R_6$ and column $C_8$. Only this single core, then, is switched from the 1 state to the 0 state, providing an output on the output windings coupled thereto.

The output windings of all the cores corresponding to a sum having the same units position digit are serially connected to form a single sum conductor, represented by an oblique line in FIGURE 1, since the cores corresponding to the same total are grouped along the diagonals of the matrix. There are 10 sum output conductors designated $S_0$, $S_1$, $S_2$, $S_3$, $S_4$, $S_5$, $S_6$, $S_7$, $S_8$ and $S_9$. These conductors are connected at one end to ground, and at the other end to the input of one of the 10 corresponding amplifiers, $A_0$, $A_1$, $A_2$, $A_3$, $A_4$, $A_5$, $A_6$, $A_7$, $A_8$, and $A_9$. Each conductor goes through the eleven cores which represent sums having the same units position digit. Thus, for example, winding $S_4$ goes through the six cores 14 and the five cores 4, that is, all those giving a total 4 or 14.

The output terminal of each of the ten amplifiers is connected to an input terminal of one of the ten logical AND circuits, $E_0$, $E_1$, $E_2$, $E_3$, $E_4$, $E_5$, $E_6$, $E_7$, $E_8$, and $E_9$. The second input terminal of each of these AND circuits is connected to the clock signal input terminal B. With this arrangement, output signals from the amplifiers $A_0$–$A_9$ will be gated through AND circuits $E_0$–$E_9$ only during "B time." Any signal from an amplifier at another time, for example "A time," is not transferred by the logical AND circuits.

Referring again to the example where the core at the intersection of row conductor $R_6$ and column conductor $C_8$ was switched first to the 1 state, at "A time," and then to the 0 state, at "B time," the output developed in sum line $S_4$ when this core returns to the 0 state is transmitted through amplifier $A_4$ and AND circuit $E_4$ to the sum output terminals to indicate the units position digit of the result of the addition 6+8. The tens position digit of this result is produced in the form of a "carry," on a carry output conductor coupled to the activated core.

The carry output conductor has not been represented for clearness sake. As the preceding conductors, it is connected at one end to ground, at the other end to a carry amplifier $A_c$. The carry conductor runs serially through all the cores which represent a result number superior to 9, that is all the cores designated 10, 11, 12, 13, 14, 15, 16, 17, 18 and 19. It is obvious that this conductor does not go through the cores representing a total of 0 to 9. As in the case of the sum amplifiers, the output of amplifier $A_c$ is connected to one input of logical AND circuit $E_c$, the second input of which is coupled to clock signal input B.

The restoring winding has not been represented in FIGURE 1 either. This winding couples serially with all of the 110 cores of the matrix. It is arranged to receive, during "C time" which follows "B time" in the computing cycle, a current pulse which generates a magnetic field —H to switch all cores back from remanence state 1 to remanence state 0. In the preceding example, the cores of row $R_6$ had been switched to the 1 state at "A time," core 14 had been switched back to the 0 state at "B time," thus generating an output signal. The 9 other cores of row $R_6$ are thus switched back to state 0 "C time," but the signal generated in the sum or carry output windings during this resetting operation cannot be transmitted by logical AND circuits $E_0$–$E_9$, since the second inputs of these circuits are not provided during "C time." At the end of "C time," all 110 cores of the matrix have been returned to their initial state and a new adding cycle may be commenced.

In FIGURE 1, one of the cores, at the intersection of row $R_7$ and column $C_2$ has been represented in considerably increased size so that the direction of the conductors therethrough may be indicated. The row conductor provided to record the first term of the addition passes through the core such as it generates a magnetic field opposed to that generated by the column conductor which inserts the second term. Thus the first one switches the cores from state 0 to state 1, and the second one from state 1 to state 0. The couplings to all 110 cores are the same.

To summarize, the computing matrix performs a computing operation during three successive steps, A, B, and C. Initially, all 110 cores of the matrix are in remanence state 0. At "A time," the pulse generated by pulse generator G is passed through the grounded row conductor switching all the cores of the corresponding row from the 0 state to the 1 state to record the first term. During "B time," the pulse generated by pulse generator G' is passed through the grounded column conductor to switch back all the cores of the determined column to the initial saturation state to enter the second term and read out the result. Only the core which is at the intersection of the determined row and column, generates, when returning to its initial state, one or two input signals which characterize both the row and the column selected, and therefore the two terms of the operation to be performed. The sum output signal, and, if it does exist, the carry output signal, appear during "B time," that is, simultaneously with the introduction of the second term of the addition. During the third time, C, all the cores of the matrix are restored to saturation state 0, so that, at the end of that time, the matrix is again in its initial state and ready to start another operation cycle.

To perform a full addition, that is, to produce a sum which takes into consideration not only the terms of the immediate order, but also the possibility of a carry from the addition of the next lower order, it is necessary to provide some suitable device capable of adding to one term of the immediate order the carry, if any, from the next lower order. Such a device will be described with reference to FIGURES 10a and 10b. The matrix of FIGURE 1 comprises 11 rows and 10 columns, because the first term increased by a carry from a lower order may range between 0 and 10 whereas the second term ranges only between 0 and 9.

Figure 2:
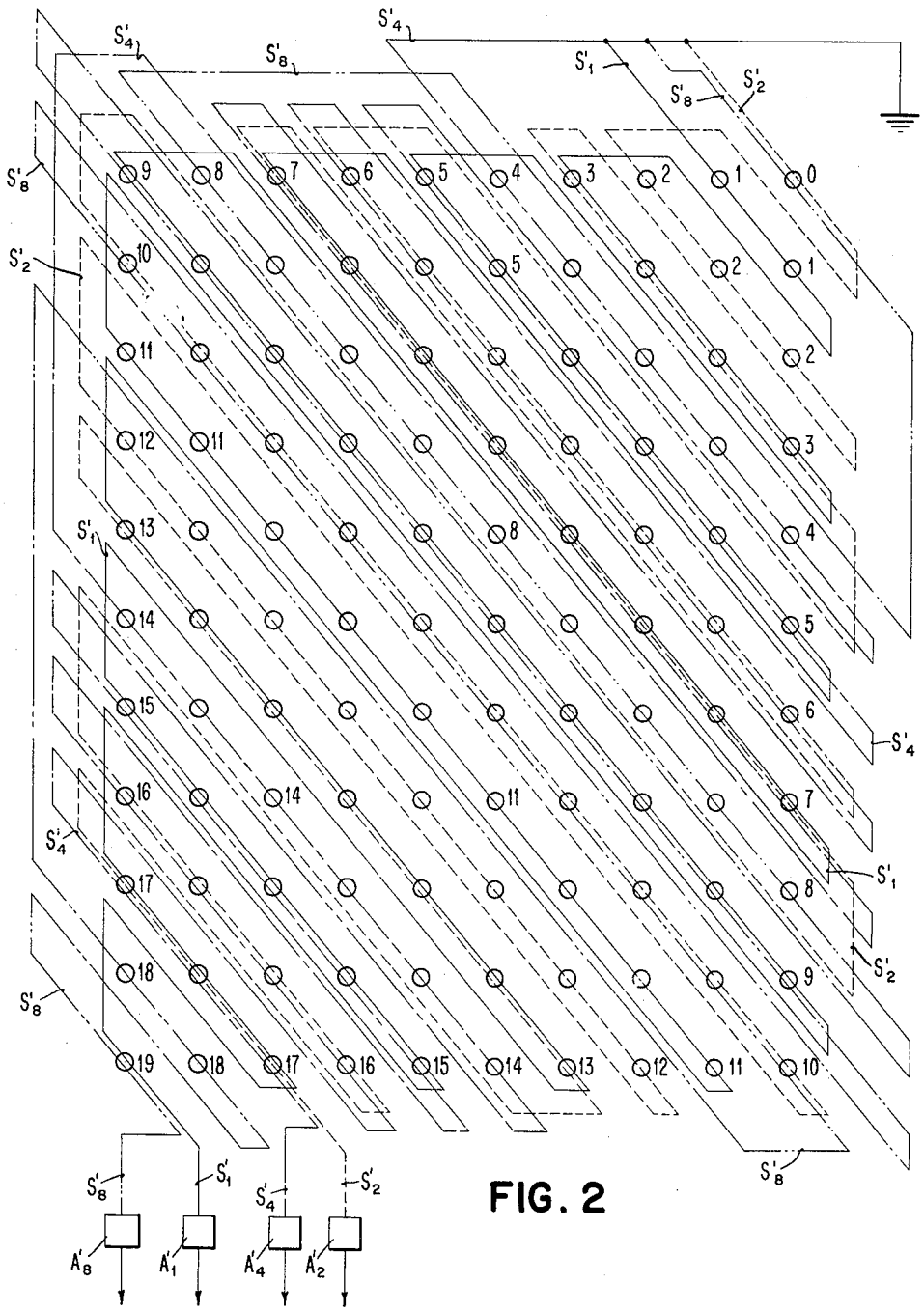
FIGURE 2 illustrates a modified winding arrangement for the output windings of an addition matrix such as that shown in FIGURE 1 to provide outputs in a binary coded decimal form.

It is obvious that, instead of using the decimal notation, a matrix provided in accordance with the present invention might be arranged to use any other numeration system. Thus, for example, when operating according to the binary system, a matrix with four magnetic cores might perform an addition, and a matrix with six cores a full addition, i.e. which would take into account a possible carry from the addition of the immediately lower order. Moreover, though the matrix represented in FIGURE 1 is arranged to add two decimal terms and to provide a decimal sum, it is obvious that it is not necessary that these three numbers should be represented in the same number system. A combination of different number systems might be used if desired. For example, by employing an output winding arrangement such as is shown in FIG. 2, with the adder matrix of FIG. 1 it is possible to provide a system for adding two decimal numbers and obtaining a sum in the binary coded decimal code. As illustrated in FIG. 2, a matrix of 11 rows and 10 columns of magnetic cores, arranged as previously described, may be provided with 4 output conductors $S'_1$, $S'_2$, $S'_4$, and $S'_8$, each representing a different bit of the well-known binary decimal code. According to this code the several decimal numbers are represented by different combinations of four binary bits weighted with the values 8, 4, 2, and 1 respectively. According to this notation, the decimal digit 7, for example, is represented by the code group 0111, whereas the decimal number 8 is represented by the code group 1000 and so on. The subscripts of the reference characters $S'_1$–$S'_8$ identify the binary code bids which the output conductors represent. The conductors $S'_1$, $S'_8$, are threaded through the cores of the matrix in such a fashion that they convert the decimal result numbers assigned to the several cores into the equivalent binary coded decimal notation. The several output windings feed amplifiers $A'_1$, $A'_2$, $A'_4$, and $A'_8$ in the manner described with reference to the output windings of FIG. 1. While not shown, timing gates similar to the gates $E_0$–$E_9$ of FIG. 1 are also provided for sampling the several output amplifiers at the appropriate time.

When an addition operation is performed with a matrix provided with the output winding arrangement of FIG. 2, the two terms (for example the decimal numbers 6 and 8) are entered as described with reference to FIG. 1 to set and then reset the core common to row 6 and column 8. It will be observed in FIG. 2 that this core (which represents the decimal sum 14) is coupled only by conductor $S'_4$. During the resetting operation, a voltage is induced in winding $S'_4$ to represent the binary coded decimal equivalent of the units digit of the sum 14. A carry winding (not shown) similar to that described in connection with FIG. 1 also couples the core representing the sum 14 to signal a carry to the computer or to the next higher order of addition.

Where outputs are provided in a binary coded form, as shown in FIG. 2, it is sometimes desirable to employ a parity checking system to indicate malfunctions in the system which produce erroneous code groups. Parity checking systems, which are generally well-known in the art, employ an extra bit for each coded digit representation, the value of which is selected so that the total number of binary 1's in the coded representation of a decimal digit is always even (for an even parity system) or odd (for an odd parity system). When such a system is employed, any single error, for example, the malfunction of an amplifier $A'_1$–$A'_8$ may be discovered since the total number of 1's in the code representation will vary from the normal number, that is to say, if an even parity is employed, a single error will produce a code group having an odd number of 1's or in an odd parity system a single error will produce a code representation containing an even number of 1's. Such a parity checking system may be included in the circuit of FIG. 2 by providing a parity bit generating winding which threads those cores corresponding to result numbers which are represented by a binary code group having either an even number or an odd number of binary 1's, depending upon whether even or odd parity is desired. For example, if an even parity system is employed the parity bit winding would couple the cores corresponding to the decimal result numbers 1, 2, 4, 7 and 8 so that when any one of these cores is operated to produce a coded output, the parity bit generating winding also produces an output. For the sake of clarity the parity bit generating winding has been omitted from FIG. 2.

Figure 10B:
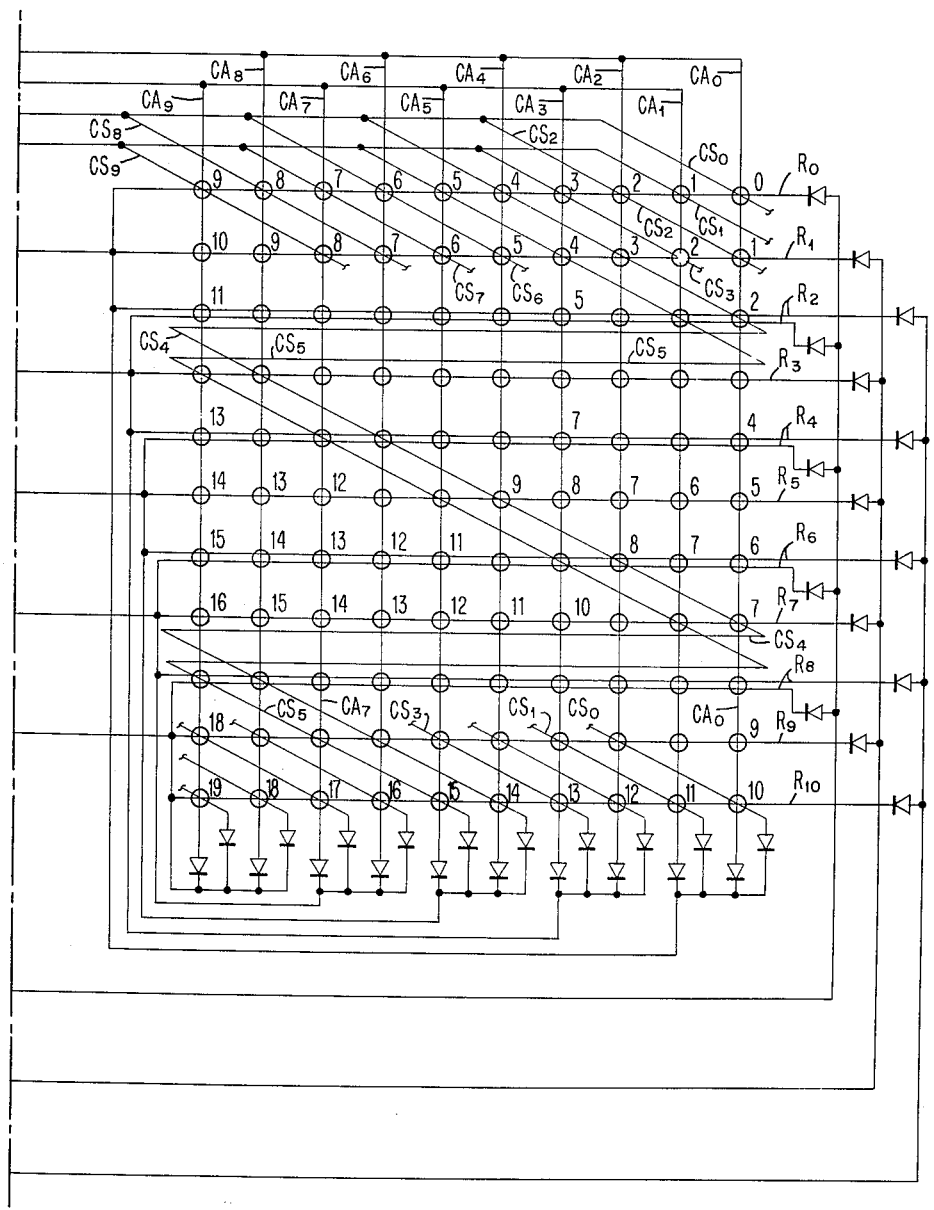

It has just been shown how a matrix might be provided for receiving two input terms in the decimal notation and providing an output in the binary coded decimal notation. It will be understood that other combinations of number systems might also be employed. For example, it is possible to provide a matrix which receives one input term in decimal code, another input term in a biquinary code, and which produces an output in the binary coded decimal code just described. FIGS. 10a and 10b, described in detail later herein, disclose a matrix which receives both input terms in the biquinary code. This system includes means for responding to a biquinary coded term to activate one of the 11 row conductors of the matrix. This means for energizing one of the 11 row conductors in response to a biquinary term may be combined with the means for energizing one of the 10 column conductors in response to a decimal term as shown in FIG. 1 to provide a matrix which responds to numbers of different code notations.

Whatever may be the number system used, and the arithmetical operation to be performed, a matrix provided in accordance with the invention and therefore not relying upon the principle of the half current coincidence, would offer the same advantages; that no upper limit is imposed on the recording or interrogating currents of the magnetic cores, that these currents need not be calibrated, and may be very high which increases the operation speed, and that the cores used need not have a rectangular hysteresis loop. In addition, a matrix provided in accordance with the present invention obviates the necessity of providing temporary storage of the first term of the operation while waiting for the arrival of the second term so that they may be applied simultaneously to the computing matrix since the two terms may be applied successively. As soon as the first one occurs, it is recorded in the matrix, which acts then as a buffer storage, and when the second term is inserted, it causes the extraction of the result of the operation.

Figure 3:
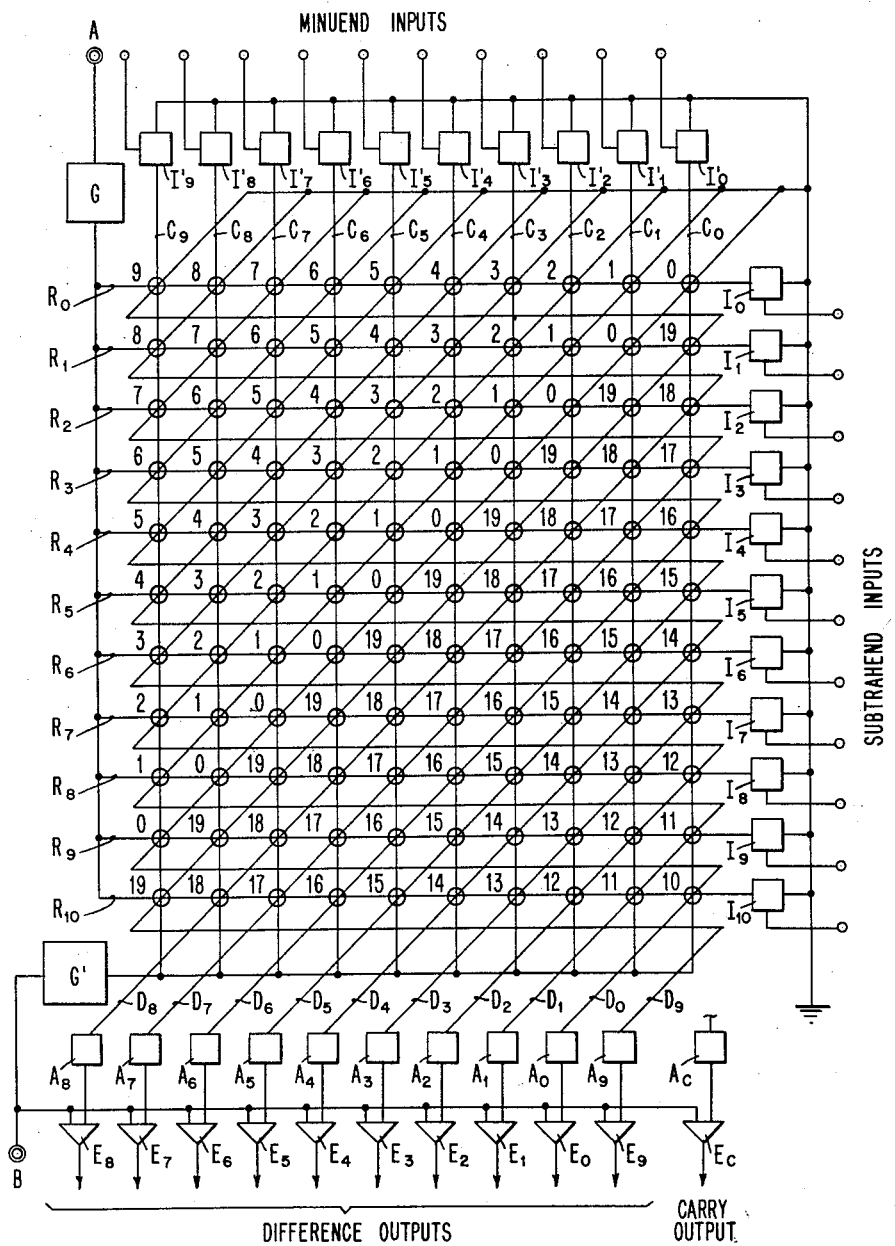
FIGURE 3 illustrates a computing matrix provided in accordance with the present invention for performing subtractions according to the decimal number system.

The same principle and advantages are found again when the matrix is used to perform other arithmetical operations, for example, subtractions, as illustrated in FIGURE 3. The matrix of FIGURE 3 and its operation are identical to the matrix of FIGURE 1, and its operation, except for the output conductor arrangement. As in the preceding case, the matrix is made of 110 cores, arranged in 11 rows $R_0$ to $R_{10}$, and 10 columns, $C_0$ to $C_9$. Two pulse generators G and G' are provided for supplying drive pulses during "A time" and "B time." 11 row selecting switches $I_0$ to $I_{10}$ which determine the first term, and 10 column selecting switches $I'_0$ to $I'_9$ which determine the second term are provided as in FIGURE 1. The operation to be performed in this embodiment consists in subtracting the first term (possibly increased by a carry from the preceding subtraction) from the second term. The 110 cores are designated 0 to 19, their reference numbers corresponding to the difference between the subscript of the column and that of the row. Thus, for example, at the intersection of row $R_6$ and column $C_8$, the core is designated 2 which actually represents difference 8—6. All cores representing the same difference are along the same diagonal, for example, the eight cores designated 2 and representing the following differences: (9—7), (8—6), (7—5), (6—4), (5—3), (4—2), (3—1) and (2—0) are arranged along the same diagonal. By comparing FIGURE 3 to FIGURE 1, it may be seen that the diagonals of identical numbers in the two figures are arranged along two orthogonal directions.

When the subtrahend is greater than the minuend, the substraction leads to a carry, thus for example 4 minus 5 leads 9 and there is a carry 1. The result of that operation is indicated by core 19 which is at the intersection of row $R_5$ and column $C_4$. As in the case of the adding matrix, for all the cores from 10 to 19, the units position digit represents the result of the difference, whereas the tens position digit represents the carry. Also as in the embodiment of FIGURE 1, the carry of the operation of the lower order is entered into the first term of the subtraction by a device (not shown) which allows the first term to range between 0 and 10 whereas the second term may range only between 0 and 9.

In FIGURE 3, the output conductor "subtractive carry" and the core restoring winding are not represented. The ten difference output conductors are designated $D_0$, $D_1$, $D_2$, $D_3$, $D_4$, $D_5$, $D_6$, $D_7$, $D_8$ and $D_9$. Each of these conductors couples serially with the eleven cores which may provide the same units position digit result. Thus, for example, conductor $D_4$ goes through the six cores 4 and the five cores 14, i.e., all the cores providing a difference 4 with or without carry. As in FIGURE 1, these conductors are connected at one end to the input of an amplifier $A_0$, $A_1$, $A_2$, $A_3$, $A_4$, $A_5$, $A_6$, $A_7$, $A_8$ and $A_9$, each of which in turn is connected to one input of one of the logical AND circuits $E_0$, $E_1$, $E_2$, $E_3$, $E_4$, $E_5$, $E_6$, $E_7$, $E_8$ and $E_9$. As in FIGURE 1, these AND gates are conditioned by the B clock signal.

The subtraction matrix of FIGURE 3 operates on two decimal terms to provide a result according to a decimal code. It is obvious, however, that other notations or notation combinations might be used, including, as in the matrix of FIGURE 2, means for providing a result according to a coded decimal notation which might or might not include an additive bit for checking the compatibility of the result.

FIGURES 1 and 3 illustrate matrices for performing addition and subtraction. Each of these matrices operates as a table lookup device wherein each core represents or has assigned thereto a number which corresponds to the result of a predetermined arithmetic operation upon the two numbers corresponding to the row and column coordinates which identify that core. It is believed apparent, without illustration, that a similar matrix might provide the result of other types of operation, for example, multiplication. All that is required is that the result numbers assigned to the cores be made to correspond to the product of the numbers corresponding to the row and column coordinates which identify that core, rather than the sum or difference of these numbers as shown in FIGS. 1 and 3.

It is also possible to use the adding matrix of FIGURE 1 to perform subtractions, by providing means to insert the first term of the operation under its complement form. If the first term is designated X (subtrahend) and the second term is designated Y (minuend), to compute $Y-X$, it is sufficient to perform the operation $Y+(10-X)$ and to enter the first term X in 10's complement form. To operate the add matrix of FIGURE 1 so as to provide the result of a subtraction, it is sufficient to energize the input windings of row $R_0$ when the first term is a ten (10), those of row $R_1$, when $X=9$, those of row $R_2$ when $X=8$, etc. This process requires that it be known what operation is to be performed before the first term is entered. It cannot be applied to the case when the sign of the second term is not yet known when the first term is entered.

Another embodiment employing the arrangement shown in FIGURE 1 would consist in performing subtractions by interchanging the input and output terminals; for if $X+Y=Z$, $Z-X=Y$. This embodiment would require control circuits, switches, generators, output circuits and amplifiers having a reversible operation, however, since any group of conductors might be either an input group or an output group, depending upon the operation.

Another feature of the invention is the use of several arrangements, each operating in accordance with the general principle described herein, combined in a single matrix of binary elements to provide a multipurpose device. FIGURES 4–9 illustrate several different arrangements for providing such a multipurpose device.

FIGURE 4 illustrates a wiring arrangement for providing an addition-subtraction matrix having two separate sets of outputs. The arrangement of FIGURE 4 is derived by combining the adding matrix of FIGURE 1 with the subtracting matrix of FIGURE 3, preserving the input conductors which are common thereto, and superimposing their two groups of output conductors and output circuits, the first one to interpret the result as a sum and the second one as a difference. The matrix of FIGURE 4 includes a group of horizontal row conductors R inductively coupled to the cores in each row and adapted, when selectively energized in the manner described with reference to conductors $R_0$–$R_{10}$ of FIGURE 1 or 3, to enter the first term of the operation. It also includes a group of column conductors C inductively coupled to the cores in each column and adapted, when selectively energized in the manner described with reference to conductors $C_0$–$C_9$ of FIGURE 1 or 3, to enter the second term. Sum output conductors S are coupled serially to all cores having identical sum result numbers and provide addition results for the first and second terms. Difference output conductors D are coupled serially to all cores having identical difference result numbers and provide subtraction results for the first and second terms. In addition to the conductors illustrated in FIGURE 4, there must be provided separate addition carry and subtraction carry conductors (arranged as shown in FIGURES 1 and 3) and a restore winding.

It will be seen that with the arrangement shown in FIGURE 4, any number of different kinds of output conductors may be provided to produce outputs corresponding to any desired arithmetic operation. Any output pattern may be developed by assigning to the cores of the matrix result numbers representing the results of the selected operation upon the input terms which select and switch those cores. The output conductors are then coupled serially through all cores having identical numbers. The cores may have several result numbers, each corresponding to a different output conductor. For example, the core at the intersection of input conductors $R_6$ and $C_8$ may have an addition result number of 14 with a corresponding sum output winding; a subtraction result number of 2 with a corresponding difference output winding; and a multiplication result number 48 with a corresponding product output winding. Each set of output windings would have its own set of amplifiers and AND gates, or, if but one kind of operation is to be performed at one time, all sum, difference and product output corresponding to the same digit might share the same amplifier and gate.

As may be seen in FIGURE 4, the wiring of a matrix, in the manner shown, for both sum and difference outputs presents the problem that one set of output conductors, the conductors D, cannot be threaded straight through the cores because they extend perpendicular to the apertures in the cores. However, by changing the shape of the matrix from a square to a non-rectangular parallelogram, this difficulty may be avoided. FIGURE 5 shows such an arrangement. As may be seen in FIGURE 5, the matrix has been distorted from its original shape by inclining the columns until they form an angle of approximately 45° with the rows. This brings the difference output conductors D into vertical alignment and aligns the sum output conductors S at an angle of about 26.5° from horizontal. It will be readily seen that this arrangement permits all conductors to be threaded through the cores in a straight line. This is accomplished without readjusting the wiring pattern or reassigning new result numbers to the cores.

In FIGURE 7 there is illustrated a more complete embodiment of an addition-subtraction matrix wired as shown in FIGURE 5 and embodying the principles of the invention. In FIGURE 7 there is shown a matrix of 11 horizontal rows and 10 sloping columns of cores. Row conductors $R_0$–$R_{10}$ (only some of which are shown for the sake of clarity) are coupled to the cores in each row, and column conductors $C_0$–$C_9$ (dotted lines) are coupled to the cores of each column. Switches $I_0$–$I_{10}$ (partially shown) provide selective grounding for circuits through the row conductors to the pulse generator G (not shown). Switches $I'_0$–$I'_9$ (not shown) provide selective groundings of circuits through the column conductors to the pulse generator G'. The input terms are entered through the row and column conductors in the manner described with reference to FIGURE 1 to select and doubly switch one of the cores to provide outputs in its sum and difference output windings. The sum signals from the cores appear on conductors $S_0$–$S_9$ directed along a diagonal slightly inclined with respect to the column conductors. The difference output signals appear on the vertical conductors, $D_0$ to $D_9$. For example, the core at the intersection of row $R_6$ and of column $C_8$ is coupled to the sum output conductor $S_4$ (corresponding to a total 14) and on the difference output conductor $D_2$ (corresponding to difference 2). The sum output conductors lead to amplifiers $A_0$–$A_9$ and the difference conductors lead to amplifiers $A'_0$–$A'_9$.

This arrangement requires two sets of output conductors, one for the addition and another for the subtraction; thus two sets of output amplifiers and two sets of logical AND circuis are needed, one set of which is conductive, according to whether the operation to be performed is an addition or a subtraction.

According to another embodiment, which is preferred over that of FIGURES 4 and 7, the computing matrix is arranged in a more advantageous way since it makes it possible to use the same output conductors, and therefore the same output amplifiers and the same logical circuits for both the addition and the subtraction. This system requires two different sets of input windings for the second term of the operation, the first set being used for the addition, the second one for the subtraction. FIGURE 6 shows a wiring arrangement in accordance with this embodiment and FIGURE 8 represents an adding and subtracting computing matrix in accordance with this embodiment. As illustrated in FIGURES 6 and 8 the cores of the matrix are arranged in a rectangular pattern just as in FIGURE 1. Horizontal row conductors R are provided for entering the first term of the operation by switching all cores of a selected row to the 1 state. Vertical column conductors CA are provided for entering the second term of an addition operation by resetting cores in a selected vertical column to the 0 state. Output conductors 0 (dotted lines) arranged at an angle of 45° to horizontal are provided for producing sum outputs. The arrangement thus far described is identical to that of FIGURE 1. However, a second set of column conductors CS (dashed lines) for entering the second term of a subtraction operation are also threaded through the cores of the matrix. These conductors CS extend at an angle of about 26.5° from horizontal, as shown in FIGURE 6. As in the case of conductors CA, the conductors CS switch their associated cores to the 0 state. Difference outputs resulting from sequential energization of conductors R and CS are sensed in the same output windings 0 that are employed for addition. This is possible because of the unique arrangement of the two sets of second term input windings CA and CS which permit the cores of the matrix to have sum and difference result numbers which have identical units position digits.

FIGURE 8 shows the arrangement more completely. In this figure row conductors $R_0$–$R_{10}$ are partially shown as coupled to the rows of cores and to their control switches $I_0$–$I_{10}$. The row conductor pulse generator G is not shown, but is connected in the manner shown in FIGURE 1. Addition column conductors $CA_0$–$CA_9$ (partially shown) extend through the vertical columns of cores between the pulse generator G' and the control switches $I'_0$–$I'_9$. Subtraction column conductors $CS_0$–$CS_9$ extend through the matrix at an angle of approximately 26.5° from horizontal between the generator G' and a set of second term subtraction control switches (not shown). Output conductors $O_0$–$O_9$ extend through the matrix on a diagonal from ground to output amplifiers $A_0$–$A_9$. The several cores of the matrix have numbers subscribed which indicate the result numbers represented thereby. The units position digit of each number accurately indicates the units position result for the sum of the terms represented by the row conductor R and addition column conductor CA intersecting at that core and for the difference of the terms represented by the row conductor R and subtraction column conductor CS intersecting at that core. The tens position digit of each number is only accurate for the addition carry and not for the subtraction carry. In the interest of clarity, no carry output conductors are shown. A pattern for each may be easily determined by performing the addition and subtraction operations for all combinations of input terms and determining which cores must be threaded by each carry conductor.

The operation of the matrix of FIGURE 8 is believed obvious from the explanation made regarding FIGURES 1 and 3. Addition is performed in the manner described with reference to FIGURE 1 and subtraction is performed as described with reference to FIGURE 3. Subtraction differs from addition only in that care must be taken to enter the term which is subtracted from the other to the row conductors and out the column conductors. The reason for this will be apparent from the following example. Assume that the operation is 6—8. This operation should produce a difference of 8 and a subtractive carry. If 8 is entered through the row conductors, all cores in row $R_8$ will be switched to the 1 state. When 6 is entered through conductor $CS_6$ to switch all cores coupled thereto to the 0 state, only the core marked 8 in row 8 is reset. This produces an output on output line $O_8$. The carry is produced in a subtractive carry line coupled to core 8 of row 8. If the terms 6 and 8 has been entered in reverse order, that is, if the cores of row $R_6$ had been switched to the 1 state and the cores along conductor $CS_8$ reset, then the fourth core from the left along row 6 would have been switched. It will be observed that output winding $O_2$ couples with this core, so an erroneous difference would be produced.

The embodiment just described offers the advantage that only a single set of output conductors, amplifiers and gates are needed. This reduction of output components is gained at the expense of adding a set of switches and column conductors for selecting the second term in the case of a subtraction, however, and also a circuit permitting to control either of two sets of second term input switches, according to whether the operation to be performed is an addition or a subtraction. Moreover, a matrix in accordance with this embodiment requires two different carry output windings, one for the addition and one for the subtraction.

A reduction in the number of output components over the last embodiment may be realized by using 50 additive cores, which increases the computing matrix from 110 to 160 cores, but, instead of two distinct carry output windings, these cores use the same carry winding and the same carry amplifier in common for the addition and for the subtraction. Such a matrix has been represented in FIGURE 9. In that matrix, all cores designated 10, 11, 12, 13, 14, 15, 16, 17, 18, and 19 produce a carry, whether additive or subtractive. All of said cores are coupled by a carry output winding common to addition and subtraction. This winding has not been represented in the figure.

FIGURES 10a and 10b related as indicated in FIGURE 11, represent a system for performing addition and subtraction upon numbers provided in quibinary code. This system employs a matrix wired in the manner shown in FIGURE 6. One novel feature of this matrix is that both input terms of an operation are delivered through a single common set of input terminals.

In accordance with this embodiment, the addition and subtraction output conductors are common. They have not been represented in FIGURE 10b, but they are wired according to the diagonal direction of 45°, and they may be grouped so as to provide a result according to any number system, for example, according to the decimal notation if the wiring of the output windings is identical to that of FIGURE 1, or according to the binary coded decimal notation if it is identical to that of FIGURE 2, or according to the quibinary notation, as at the input, or according to any other system.

To explain the operation of the matrix, it is recalled that any number between 0 and 9 is represented in the quibinary system by the combination of two bits, one quinary element, 0, 2, 4, 6, or 8 and one binary element, 0 or 1.

The computing matrix comprises seven input terminals 0, 2, 4, 6 or 8 for the five quinary elements, and 0 and 1 for the two binary elements. As in the case of the other embodiments, this system operates during three time intervals called "A time," "B time" and "C time," respectively. During "A time" these terminals are used to introduce the first term of the operation and during "B time" they receive the second term. To enter the first term possibly increased by the carry of the preceding operation from the immediately lower order, the matrix control circuits comprise five switches $I_0$, $I_2$, $I_4$, $I_6$ and $I_8$, and three pulse generators $G_0$, $G_1$ and $G_2$; the latter are energized only during "A time." Switches $I_0$, $I_2$, $I_4$, $I_6$ and $I_8$ are energized by the input terminal corresponding thereto, 0, 2, 6, 4 or 8.

Examination of FIGURES 10a and 10b will show that each switch controls or grounds three row conductors. Switch $I_0$ controls conductors $R_0$, $R_1$ and $R_2$; switch $I_2$ controls $R_2$ (there are actually two separate $R_2$ conductors), $R_3$ and $R_4$; switch $I_4$ controls $R_4$ (again there are two), $R_5$ and $R_6$; switch $I_6$ controls $R_6$ (of which there are two), $R_7$ and $R_8$, and switch $I_8$ controls $R_8$ (of which there are also two) $R_9$ and $R_{10}$. Conductors $R_0$, and one of each of the two conductors $R_2$, $R_4$, $R_6$ and $R_8$ are coupled through a diode to the output of generator $G_0$. Conductors $R_1$, $R_3$, $R_5$, $R_7$, and $R_9$ are coupled through a diode to the output of generator $G_1$. The second one of each pair of conductors $R_2$, $R_4$, $R_6$, and $R_8$, and also conductor $R_{10}$, are coupled to the output of generator $G_2$. A row conductor $R_0$, $R_1$, $R_2$, $R_3$, $R_4$, $R_5$, $R_6$, $R_7$, $R_8$, $R_9$ and $R_{10}$ is selected by combining the quinary element which picks up one of the switches and the binary element which picks up one of the pulse generators. Thus, for example, if the first term is 7, i.e., in the quibinary form 6+1, switch $I_6$ and generator $G_1$ are picked up, which produces a pulse on the windings of row $R_7$ and which allows to enter the first term into the matrix.

The carry or the absence of a carry from the preceding operation at the immediately lower order is added before entry in the matrix to the first term, and more precisely to the binary part of the first term, by means of four logical AND circuits $E_{00}$, $E_{01}$, $E_{10}$ and $E_{11}$ and of logical OR circuit 0. The binary part, to which is added a possible carry, may be made equal to 0, 1 or 2. There appears a signal at the output of circuit $E_{00}$ if the binary element of the term to be inserted is 0 and if there is no carry, at the output of $E_{01}$ if the binary element is zero and if there is a carry, at the output of $E_{10}$ if the binary element is 1 and if there is no carry, and at the output of $E_{11}$ if the binary element is a 1 and if there is a carry. The precise connections for accomplishing this are obvious from FIGURE 10a. The output terminals of $E_{01}$ and $E_{10}$ are connected to the two input terminals of logical OR circuit 0; a signal at the output of 0 means that a 1 is to be added to the quinary part of the term to be inserted, and this output is connected to the control terminals of generator $G_1$ through logical AND circuit $F_1$. A signal at the output of $E_{00}$ means that nothing is to be added to the quinary part of the term to be inserted and this output signal is applied to the control terminal of generator $G_0$ through logical AND circuit $F_0$. A signal at the output of $E_{11}$ means that 2 is to be added to the quinary part of the term, and that signal picks up pulse generator $G_2$ through logical AND circuit $F_2$. The three logical AND circuits $F_0$, $F_1$ and $F_2$ are gated at "A time" through clock terminal A for inserting the first term, so that generators $G_0$, $G_1$ and $G_2$ cannot be energized except at "A time". Since it is not possible that more than one of the logical AND circuits $E_{00}$, $E_{01}$, $E_{10}$ and $E_{11}$ should be energized simultaneously, during "A time," one generator $G_0$, $G_1$ or $G_2$ may operate, and the cores of the row whose conductor is energized by the activated generator and grounded by the closed switch are switched from state 0 to state 1.

In some rows, $R_2$, $R_4$, $R_6$ and $R_8$, the input windings of the first term are doubled as previously mentioned. For example, row $R_4$ may be picked up by energizing both $I_4$ and $G_0$, or both $I_2$ and $G_2$. In the first case, the first input term is equal to 4, its binary part is 0, its quinary part is 4, and there is no carry; thus switch $I_4$, logical circuit $E_{00}$ and generator $G_0$ are energized. In the second case, the first term is equal to 3, its quinary element is 2, its binary element is 1 and there is a carry; in such a case, switch $I_2$, logical circuit $E_{11}$ and generator $G_2$ are energized. In both cases, the cores of row $R_4$ are switched from state 0 to state 1.

During "B time," the second term of the operation is inserted through the same input terminals 0, 2, 4, 6, 8, for the quinary element, and 0, 1, for the binary element.

In the case when the operation to be performed is an addition, the second term of the operation is inserted by energizing one of the vertical windings of columns $CA_0$–$CA_9$ selected by the combination of one of the five switches $I_0$, $I_2$, $I_4$, $I_6$ and $I_8$ (picked up by the quinary element) and one of generators $GA_0$ and $GA_1$ (picked up by the binary element of the second term). The terminals providing the binary element, 0 or 1, are connected to one input of logical AND circuits $B_0$ and $B_1$, the second input of which is provided during "B time" through clock terminal B. Thus, while the binary element of the first term of the operation, which occurs but during "A time," is not conducted by these circuits $B_0$ and $B_1$; that of the second term is transmitted either by $B_0$ and $B_1$ to pick up one input of logical circuits $EA_0$ and $EA_1$, the second input of which is provided by a signal from the terminal designated "addition" if the operation to be performed is an addition. Thus generator $GA_0$ is turned On only during "B time" if the operation to be performed is an addition and if the binary element of the second term is 0. If the binary element of the second term is 1, it is $GA_1$ which is energized. The vertical column windings $CA_0$–$CA_9$ are connected between the generators $GA_0$ and $GA_1$ and the switches $I_0$–$I_8$. The switches are thus employed for entering both terms of an operation. Examination of FIGURE 10b will show that conductors $CA_0$, $CA_2$, $CA_4$, $CA_6$, and $CA_8$ are coupled at their upper ends to generator $G_0$, while the remaining conductors $CA_1$, $CA_3$, $CA_5$, $CA_7$ and $CA_9$ are connected to generator $GA_1$. Referring now to the lower ends of these conductors, it will be seen that conductors $CA_0$ and $CA_1$ are connected to switch $I_0$; conductors $CA_2$ and $CA_3$ are connected to switch $I_2$; conductors $CA_4$ and $CA_5$ are connected to switch $I_4$; conductors $CA_6$ and $CA_7$ are connected to switch $I_6$; and conductors $CA_8$ and $CA_9$ are connected to switch $I_8$.

With the arrangement just described, any column conductor may be selected and energized by a combination of one generator and one switch. For example, if the second input term of an addition is 3, as represented by a quinary 2 and a binary 1, the switch $I_2$ is closed and generator $GA_1$ is activated. Only column conductor $CA_3$ is common to both elements and only it receives current to switch the cores coupled thereto to the 0 state.

If the operation to be performed is a subtraction, it is necessary that one of the subtraction column conductors $CS_0$–$CS_9$ be activated instead of conductors $CA_0$–$CA_9$. The conductors $CS_0$–$CS_9$ are arranged as shown in FIGURES 6 and 8 and will not be described again in detail. The upper ends of these conductors are connected to two generators $GS_0$ and $GS_1$ in the same manner as the addition column conductors are connected to generators $GA_0$ and $GA_1$. The lower ends of these conductors $CS_0$–$CS_9$ are connected to switches $I_0$–$I_8$ in exactly the same manner as the addition column conductors, as clearly shown in FIGURE 10b.

The generators $GS_0$ and $GS_1$ are selected in a manner analogous to the selection of generators $GA_0$ and $GA_1$ in accordance with the binary part of the second term. This selection is accomplished through AND circuits $ES_0$ and $ES_1$. In the case when the operation to be performed is a substraction, a terminal indicated "subtraction" receives a signal which provides an input of both logical AND circuits $ES_0$ and $ES_1$. The signal corresponding to the binary element, 0 or 1, of the second term is, as previously described, transmitted by one of logical AND circuit $B_0$ and $B_1$, one input of which is provided during "B time"; then it is conducted through one of logical AND circuits $ES_0$ and $ES_1$ to pick up one of pulse generators $GS_0$ or $GS_1$. The combination of the energization of one of these generators $GS_0$ or $GS_1$ and one of switches $I_0$, $I_2$, $I_4$, $I_6$ or $I_8$, picked up by the quinary element of the second term causes an input conductor of the group $CS_0$–$CS_9$ to be selected.

To summarize switches $I_0$, $I_2$, $I_4$, $I_6$, and $I_8$ are used during "A time" to insert the quinary element of the first term and during "B time" to insert the quinary element of the second term. The binary element of the first term together with the carry are inserted by one of generators $G_0$, $G_1$ or $G_2$. The binary element of the second term is inserted by generators $GA_0$ or $GA_1$, if it is an addition and $GS_0$ or $GS_1$ if it is a subtraction. In each case the first term switches the cores of one row to the 1 state and the second term switches the cores of a column back to the 0 state.

The 35 no-return diodes represented in FIGURE 10b prevent the currents from flowing through unwanted back circuits.

The addition output windings and the subtraction output windings are common, as has been explained with reference to FIGURE 8. They have not been represented in FIGURE 10b.

It is obvious that this single computing matrix for performing additions and subtractions, and receiving quibinary inputs and providing outputs in any system, is but one embodiment, and any modification for performing other arithmetical operations or using other number systems to insert data or to extract the results, any substitutions, suppressions or adjunctions in the realization of that computing device and particularly all modifications concerning the nature of the binary elements which compose the matrix, their arrangement, wiring, etc. would be within the scope of the invention.

While the invention has been particularly shown and described with reference to preferred embodiments thereof, it will be understood by those skilled in the art that various changes in form and details may be made therein without departing from the spirit and scope of the invention.

What is claimed is:

1. Switching means comprising a plurality of elements each capable of assuming two distinctly different stable states, a plurality of energizing devices for each element, each said energizing device being operable when actuated to condition the associated element in a selected stable state, said energizing devices for the several elements being arranged in a plurality of main groups, each element having an energizing device of each of the main groups, each said main groups being divided into a plurality of sub-groups, a plurality of separate activating circuits each interconnecting all of the energizing devices of a different sub-group to cause contemporaneous activation of all the energizing devices in the associated sub-group, means operable during a first time period for selectively activating one of the activating circuits which interconnects the energizing devices of a sub-group of one main group to switch the elements having energizing devices of said sub-group to a first selected stable state, and means operable during a second time period for selectively activating one of the activating circuits which interconnects the energizing devices of a sub-group of another main group to switch the element having energizing devices of said last named sub-group to a second stable state, the element having energizing devices of both the activated sub-groups being thereby switched first to a first state and next to a second state.

2. The invention defined in claim 1 wherein there are two of said main groups of energizing devices and wherein each bistable element is individually identifiable by a specific combination of two sub-groups, one from each of the two main groups.

3. The invention defined in claim 1, wherein there are three main groups and wherein each bistable element is individually identifiable by each of two specific combinations of two sub-groups, the sub-groups of each said specific combination being from different main groups.

4. The invention defined in claim 1 wherein the bistable elements comprise bistable magnetic cores and wherein the energizing devices comprise windings inductively coupled to said magnetic cores.

5. Switching means comprising a plurality of elements each having first and second stable states, means connected to all said elements for conditioning them in their first states, a plurality of energizing devices for each element, each said energizing device being capable when activated of fully changing the state of the associated element, said energizing devices being arranged in a plurality of main groups, each element having an energizing device of each of the main groups, each said main group being divided into a plurality of sub-groups, the sub-groups within a main group including equal numbers of energizing devices, a plurality of separate activating circuits each interconnecting all of the energizing devices of a different sub-group to cause contemporaneous activation of all the energizing devices in the associated sub-group, means operable during a first time period for selectively activating the activating circuit of a selected one sub-group of one main group to switch the elements having energizing devices of said sub-group to the second stable state, and means operable during a second time period for selectively activating the activating circuit of a selected one sub-group of another main group to switch the elements having energizing devices of said last named sub-group to the first stable state, the element having energizing devices in both activated sub-groups being thereby switched twice.

6. The invention defined in claim 5 wherein there are two of said main groups of energizing devices and wherein each bistable element is individually identifiable by a specific combination of two sub-groups, one from each of the two main groups.

7. The invention defined in claim 5 wherein the bistable elements comprise bistable magnetic cores and wherein the energizing devices comprise windings inductively coupled to said magnetic cores.

8. A switching system comprising a plurality of bistable circuit elements arranged in a coordinate array of rows and columns, a plurality of separate row energizing means each coupled to all of the bistable elements of a different row and operable when energized to switch the elements coupled thereto from a first stable state to a second stable state, a plurality of separate column energizing means each coupled to all of the bistable elements of a different column and operable when energized to switch the elements coupled thereto to the first stable state, means for selectively energizing first a selected one of said row energizing means and next a selected one of said column energizing means to switch all elements of a selected row to the second state and then only the element common to the selected row and column to the first state, and means associated with each said bistable element responsive to a change of the associated element from the second state to the first state for producing an output.

9. The invention defined in claim 8 wherein the bistable circuit elements are magnetic cores exhibiting substantial magnetic remanence, and wherein the row and column energizing means comprise conductors including windings inductively coupled to the cores in the associated rows and columns.

10. A computing matrix for performing more than one kind of arithmetic operation comprising a plurality of bistable elements arranged in a coordinate array of rows and columns, a first group of coordinate energizing means each representing a different value of a first input term and each coupled to the bistable elements of a different row, each said energizing means operable when activated to switch the elements of its corresponding row from a first stable state to a second stable state, a second group of coordinate energizing means each representing a different value of a second input term and each coupled to the bistable elements of a different column, each energizing means of the second group operable when activated to switch the elements of its corresponding column to the first stable state, a state change responsive means coupled to each bistable element, each said state change responsive means representing the low order digit of the result of a first predetermined arithmetic operation upon the input term values represented by the row and column energizing means common to the element to which said state change means is coupled, all state change means representing the same digit being connected in a common output circuit, there being one output circuit for each different digit, and a third group of coordinate energizing means each representing a different value of the second input term and each operable when energized to switch elements coupled thereto to the second stable state, each of the energizing means of the third group being coupled to every element of the array the state change means of which represents a digit corresponding to the low order digit of the result of a second predetermined arithmetic operation upon the term represented by the said energizing means of the third group and the term represented by energizing means of the first group which couples to that element.

11. The invention defined in claim 10 wherein the bistable elements are bistable magnetic cores and wherein the coordinate energizing means of each of the three groups comprise current conductors including windings inductively coupled to the associated magnetic cores.

12. A computing matrix for performing more than one kind of arithmetic operations comprising a plurality of bistable elements arranged in a coordinate array, a first state change producing means coupled to each element, the first said state change producing means representing one predetermined value of a first input term, a second state change producing means coupled to each element, the second state change means representing one predetermined value of a second input term, a state change responsive means coupled to each element, said state change responsive means representing a digit corresponding to the low order digit of the result of a first predetermined arithmetic operation involving first and second input terms having the values represented by the first and second state change producing means coupled to the associated element, third state change producing means coupled to each element, said third state change producing means representing a value of a second input term which when involved in a second predetermined arithmetic operation with a first input term having the value represented by the first state change producing means coupled to the element will provide a result the low order digit of which is equal to the digit represented by the state change responsive means of the element, and circuit connections connecting all of the first state change producing means representing equal values in common circuits, and connecting all of the second state change producing means having equal values in common circuits and connecting all of the third state change producing means having equal values in common circuits and connecting all of the state change responsive means having equal values in common circuits.

13. A computing matrix for performing more than one kind of arithmetic operations comprising a plurality of bistable elements arranged in a coordinate array, a first state change producing means coupled to each element, the first said state change producing means representing one predetermined value of a first input term, a second state change producing means coupled to each element, the second state change means representing one predetermined value of a second input term, a first state change responsive means coupled to each element, said first state change responsive means representing a digit corresponding to the low order digit of the result of a first predetermined arithmetic operation involving first and second input terms having the values represented by the first and second state change producing means, a second state change responsive means coupled to each element, said second state change responsive means representing a digit corresponding to the low order digit of a second predetermined arithmetic operation involving first and second input terms having the values represented by the first and second state change producing means coupled to the element, and circuit connections connecting all of the first state change producing means having equal values in common circuits and connecting all of the second state change producing means having equal values in common circuits and connecting all of the first state change responsive means having equal values in common circuits and connecting all of the second state change responsive means having equal values in common circuits.

14. A computing matrix for performing more than one kind of arithmetic operation comprising a plurality of bistable magnetic elements arranged in a coordinate array, a first input winding coupled to each element, the first said input winding representing one predetermined value of a first input term, a second input winding coupled to each element, the second input winding representing one predetermined value of a second input term, an output winding coupled to each element, said output winding representing a digit corresponding to the low order digit of the result of a first predetermined arithmetic operation involving first and second input terms having the values represented by the first and second windings coupled to the associated element, a third input winding coupled to each element, said third input winding representing a value of a second input term which when involved in a second predetermined arithmetic operation with a first input term having the value represented by the first input winding coupled to the element will provide a result the low order digit of which is equal to the digit represented by the output winding of the element, and circuit connections connecting all of the first input windings representing equal values in common circuits, and connecting all of the second input windings having equal values in common circuits and connecting all of the third input windings having equal values in common circuits and connecting all of the output windings having equal values in common circuits.

15. In a switching device, a plurality of bistable elements arranged in rows and columns, a plurality of separate row energizing circuit means each coupled to all of the elements of a different row and operable when energized to switch the elements of the associated row to a first stable state, row driver means coupled to said row energizing means, a plurality of column energizing circuit means each coupled to all of the elements of a different column and operable when energized to switch the elements of the associated column to a second stable state, column driver means coupled to said column energizing means, a plurality of switches, each said switch controlling a circuit between at least one row energizing circuit means and the row driver means and also a circuit between at least one column energizing circuit means and the column driver means, and input means operable during a first time interval to selectively and temporarily close one of said switches and activate the row driver means to activate a selected one of said row energizing circuit means and switch the cores of the selected row to the first state, and operable during a second time interval to selectively and temporarily close one of said switches and activate the column driver means to activate a selected one of the column energizing circuit means and switch the cores in the associated column to the second stable state.

16. The invention defined in claim 15 including restoring means operable prior to operation of said input means, to switch all said bistable elements to the second stable state.

17. Magnetic switching means comprising a group of magnetic cores arranged in rows and columns, separate row and column coils coupling the cores in the rows and columns, one end of each row coil being connected to one end of one of the column coils to form a common circuit point between said row and column, row driver means coupled to the ends of said row coils opposite the first named ends, column driver means coupled to the ends of said column coils opposite the first named ends, a plurality of switches, each of said common circuit points being connected through one of said switches to reference potential whereby closing of one of said switches completes a circuit from said row driver means through a row coil to reference potential and from said column driver means through a column coil to reference potential, means responsive to a row address signal to close a selected switch and activate said row driver means, and means responsive to a subsequent column address signal to close a selected one of said switches and activate said column driver means.

18. A computing matrix selectable to perform either of two kinds of arithmetic operations comprising a plurality of bistable magnetic elements arranged in a coordinate array, a first input winding coupled to each element, the first said input winding representing one predetermined value of a first input term, a second input winding coupled to each element, the second input winding representing one predetermined value of a second input term, an output winding coupled to each element, said output winding representing a digit corresponding to the low order digit of the result of a first predetermined arithmetic operation involving first and second input terms having the values represented by the first and second windings coupled to the associated element, a third input winding coupled to each element, said third input winding representing a value of a second input term which when involved in a second predetermined arithmetic operation with a first input term having the value represented by the first input winding coupled to the element will provide a result the low order digit of which is equal to the digit represented by the output winding of the element, a plurality of separate first input coil means each including all of the first input windings representing equal values, a plurality of separate second input coils each including all of the second input windings representing equal values, a plurality of separate third input coils each including all of the third input windings representing equal values, means for activating one of said first input coils in accordance with the value of a first term to switch the elements common to said one input coil from a first stable state to a second stable state, means for activating a predetermined one of each of said second and third coils in accordance with the value of a second term to switch the elements common to said ones of said second and third pluralities of coils and said first plurality of coils from said second state to said first state, operation selecting means for selecting the kind of operation to be performed, and means responsive to said operation selecting means for preventing activation of either said second or third group of coils References Cited in the file of this patent

UNITED STATES PATENTS 2,939,119    Einsele                May 31, 1960
2,955,303    Collins                 Aug. 8, 1961

OTHER REFERENCES

Vogl-Magnetic Core Matrix Adder, IBM Technical Disclosure Bulletin, volume 2, No. 3 (October 1959), pages 55, 56.